(12) United States Patent
Ehnebuske et al.

(10) Patent No.: US 7,137,101 B1
(45) Date of Patent: Nov. 14, 2006

(54) APPARATUS AND METHOD FOR PERFORMING GENERAL INTEGRITY CHECKS USING INTEGRITY RULE CHECKING POINTS IN AN ENTERPRISE APPLICATION

(75) Inventors: David Lars Ehnebuske, Georgetown, TX (US); Barbara Jane Alspach McKee, Austin, TX (US); Stewart Laundon Palmer, Bedford, NY (US); James Thomas Rayfield, Ridgefield, CT (US); Isabelle Marie Catherine Rouvellou, New York City, NY (US); Ian David Simmonds, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 09/204,971

(22) Filed: Dec. 3, 1998

(51) Int. Cl.
*G06F 9/44* (2006.01)

(52) U.S. Cl. ...................... 717/108; 717/116

(58) Field of Classification Search ............... 717/1, 717/108, 116; 705/4, 7
See application file for complete search history.

(56) References Cited

U.S. PATENT DOCUMENTS

| | | | | | |
|---|---|---|---|---|---|
| 4,910,691 | A | * | 3/1990 | Skeirik | 706/45 |
| 5,680,602 | A | * | 10/1997 | Bloem et al. | 707/1 |
| 5,701,400 | A | * | 12/1997 | Amado | 706/45 |
| 5,812,394 | A | * | 9/1998 | Lewis et al. | 364/146 |
| 5,819,022 | A | * | 10/1998 | Bandat | 717/1 |
| 5,872,915 | A | * | 2/1999 | Dykes et al. | 717/1 |
| 5,890,133 | A | * | 3/1999 | Ernst | 705/7 |
| 5,892,905 | A | * | 4/1999 | Brandt et al. | 717/1 |
| 5,930,512 | A | * | 7/1999 | Boden et al. | 705/7 |
| 5,958,003 | A | * | 9/1999 | Preining et al. | 709/100 |
| 5,960,420 | A | * | 9/1999 | Leymann et al. | 707/1 |
| 5,978,785 | A | * | 11/1999 | Johnson et al. | 706/54 |
| 6,009,405 | A | * | 12/1999 | Leymann et al. | 705/9 |
| 6,011,917 | A | * | 1/2000 | Leymann et al. | 717/2 |
| 6,023,702 | A | * | 2/2000 | Leisten et al. | 707/100 |
| 6,028,997 | A | * | 2/2000 | Leymann et al. | 717/1 |
| 6,029,144 | A | * | 2/2000 | Barrett et al. | 705/30 |
| 6,038,538 | A | * | 3/2000 | Agrawal et al. | 705/7 |
| 6,065,009 | A | * | 5/2000 | Leymann et al. | 707/10 |
| 6,073,111 | A | * | 6/2000 | Leymann et al. | 705/8 |
| 6,122,633 | A | * | 9/2000 | Leymann et al. | 707/10 |
| 6,125,384 | A | * | 9/2000 | Brandt et al. | 709/203 |
| 6,138,088 | A | * | 10/2000 | Goeser | 704/9 |
| 6,237,020 | B1 | * | 5/2001 | Leymann et al. | 709/201 |
| 6,278,977 | B1 | * | 8/2001 | Agrawal et al. | 705/7 |
| 6,308,224 | B1 | * | 10/2001 | Leymann et al. | 709/310 |

OTHER PUBLICATIONS

"Principles of Object-Oriented Analysis and Design" James Martin, PTR Prentice Hall Ch 1-22 & Appendix A Jun. 1, 1992.*
"Code Complete" A Practical Handbook of Software Construction, Microsoft Press, Steve McConnell, p. 94-109.*
IBM Dictionary of Computing, George Mc Daniel, pp. 1, 119, 185, 586 and 597 published Aug. 1993.*
Using the SNAP Programming Language, Template Software, version 8.0 Chapter 6, 1997.*
"Deploying Distributed Business Software", Ted Lewis, pp. 125-143, SIGS Books New York, New York, Feb. 19, 1996.*

* cited by examiner

*Primary Examiner*—T. D. Ingberg
(74) *Attorney, Agent, or Firm*—Duke W. Yee; David A. Mims, Jr.; Mari Stewart

(57) ABSTRACT

A method and apparatus for performing general integrity checks using rules in an application running on a data processing system. A point is identified at which a unit of work is to complete. The unit of work includes a plurality of participants. Responsive to determining that the unit of work is to complete, rules associated with each participant in the unit of work are obtained. Responsive to obtaining the rules, the rules obtained for each of the participants are run. Responsive to running the rules, the general integrity of the application state with respect to the unit of work is determined. Responsive to determining the general integrity of the application state, the unit of work is completed by committing it or aborting it.

29 Claims, 3 Drawing Sheets

Management Group's (OMG) Business Object Management Special Group (BOMSIG) took the task of developing a consensus meaning for the term. Business Objects are representations of the nature and behavior of real world things or concepts in terms that are meaningful to the business. Customers, products, orders, employees, trades, financial instruments, shipping containers and vehicles are all examples of real-world concepts or things that could be represented by Business Objects. Business Objects add value over other representations by providing a way of managing complexity, giving a higher level perspective, and packaging the essential characteristics of business concepts more completely. We can think of Business Objects as actors, role-players, or surrogates for the real world things or concepts that they represent.

APPARATUS AND METHOD FOR PERFORMING GENERAL INTEGRITY CHECKS USING INTEGRITY RULE CHECKING POINTS IN AN ENTERPRISE APPLICATION

CROSS REFERENCE TO RELATED APPLICATION

The present invention is related to applications entitled "Method and Data Processing System for Specifying and Applying Rules to Classification Based Decision Points in an Application System," U.S. patent application Ser. No. 09/204,970, filed on even date hereof, assigned to the same assignee; and "Method and Apparatus for Applying Business Rules in an Object Model Driven Context," U.S. patent application Ser. No. 09/204,973, filed on even date hereof, assigned to the same assignee, which are incorporated herein by reference.

BACKGROUND OF THE INVENTION

1. Technical Field

The present invention relates generally to an improved data processing system and in particular to an improved method and apparatus for managing a business application system that relies on a large number of business rules. Still more particularly, the present invention relates to an improved method and apparatus for checking application state integrity through externalized rules in a business system.

2. Description of Related Art

Businesses use a wide variety of computer hardware and software products, for many different purposes. The hardware of a typical business information system includes a multitude of interconnected computers, printers, scanners, communications equipment, and other peripheral devices, allowing the business to automate much of the processing of its business information. The computers may be of different types, such as mainframes, minicomputers, or network servers supporting client workstations (personal computers, or PCs), or some combination of the foregoing. Business software includes (without limitation) accounting, word processing, database management, communications, publishing, and multimedia presentation software, as well as payroll, financial planning, project management, decision and support, personnel records, and office management software and further including specific business applications such as insurance claims and losses, credit approval, order entry and inventory, etc. All of these programs can run on a variety of platforms, including different operating systems. Businesses often have an Information Services or Information Technology (IT) department which is responsible for the overall management, support and planning of the company's information system needs.

One of the claims for object-oriented programming is that it makes it easier for software to model real-life business situation. The new vision of computing is of distributed Business Objects existing as independently developed executables or binaries, which can be redeployed as self-contained units anywhere in a network, and on any platform. While this represents a step forward, businesses are finding that encapsulating business logic into Business Objects provides insufficient additional flexibility over that provided by procedural-based applications.

Although the term Business Object has been in widespread use, no formal definition existed until the Object Implementing rules within Business Objects enables businesses to quickly change their automated policies and practices as business conditions change. For example, during the execution of an application, business rules can be used to decide whether to extend credit to a customer and if so under what terms. By implementing these determinations as externalized rules, they can be changed as needed without reworking the application that uses them.

Historically, developers creating business applications have embedded the rules of these applications directly in the applications themselves. Developers have built these systems without explicit regard for the changing nature of business rules. As a result, when business policies and practices change—and they're constantly changing—it's difficult, costly, and time consuming to reflect those changes in the applications that implement them.

More recently, developers have implemented business rules in database triggers. In response to database changes, database triggers are automatically invoked by a database server. The code in the triggers can execute some procedural logic as well as manipulate the database. Database triggers and stored procedures offer the advantage of modularity. They isolate business rules and technical data-manipulation rules from application logic. Triggers automate business rules processing and provide application independence (any application changing the database causes the triggers to be fired). However, triggers also have some serious disadvantages. They are hard to develop. They are intended to implement technical data-manipulation rules as well as business rules, and they are hard to maintain and extend particularly when they are used to implement business policies and practices.

Database triggers are frequently expressed in the dialect of the databases in which they're to be implemented. These languages are frequently proprietary and complex. Development is a text-editing task. There are few, if any, visual tools to assist developers in specifying trigger code.

Database triggers function on the elements and values of a database. Their specification is far more technically oriented then business oriented. Some triggers implement business rules, but many implement and enforce data integrity and data consistency. Applications builders who are using a trigger built by another developer might have difficulty deducing the business rules implemented by the trigger by looking at trigger code. Business analysts, the individuals who should be responsible for business rules specification, frequently find the triggers hard to learn and understand.

Database triggers are also hard to maintain. Developers may find it difficult to change triggers in response to business changes. Trigger development rarely fits into the overall flow of large-scale object-oriented application development. As a result, triggers tend to be hard to understand and relate to the application's business logic.

More recently, object-oriented business rules technologies have evolved which allow rules to route work through the tasks of a business process, where reasoning can be applied to complex decision-making, and where knowledge systems can perform operator assistance.

Object-oriented business rules technologies base rule processing on an application's object model or component model. Some products based on these technologies use inferencing techniques on an application's object model to create, delete, and manipulate variables and objects and to determine their values. Other products utilize a technique which always fires a rule before or after an object method. Both of these techniques are very programmer intensive, as they are built right into the objects themselves.

Business rules are different from Business Objects. Business Objects represent business entities like customers, products, and orders. They encapsulate the data and behavior needed to perform business functions. Business rules implement the policies and practices of an organization. They control the ways that Business Objects perform business functions. However, problems still exist for developers in specifying, identifying, and managing rules for an application.

As businesses have moved to object-oriented applications as a means of making them more flexible and adaptable to changes in their business, these businesses are finding that encapsulating business logic in business objects provides insufficient additional flexibility over that provided by the procedural-based applications they have written for years. One result is that businesses are now looking toward externalizing business decisions into business rules, which are described and manipulated by business experts instead of by programmers. Furthermore, a large number of general integrity rules are present, which gives the application the flexibility it needs to function in a "generic" manner. Typically, these rules always have to be true except possibly during some specific rule free period such as during the middle of a business operation. Constantly checking these type of general integrity rules all of the time is impractical.

Therefore, it would be advantageous to have an improved method and apparatus for general integrity rule checking to be performed just before the completion of a business function.

SUMMARY OF THE INVENTION

The present invention provides a method and apparatus for performing general integrity checks using rules in an application running on a data processing system. A point is identified at which a unit of work is to complete. The unit of work includes a plurality of participants. Responsive to determining that the unit of work is to complete, rules associated with each participant in the unit of work are obtained. Responsive to obtaining the rules, the rules obtained for each of the participants are run. Responsive to running the rules, the general integrity of the system with respect to the unit of work is determined. Responsive to determining the general integrity of the application state, the unit of work is completed by committing it or aborting it.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
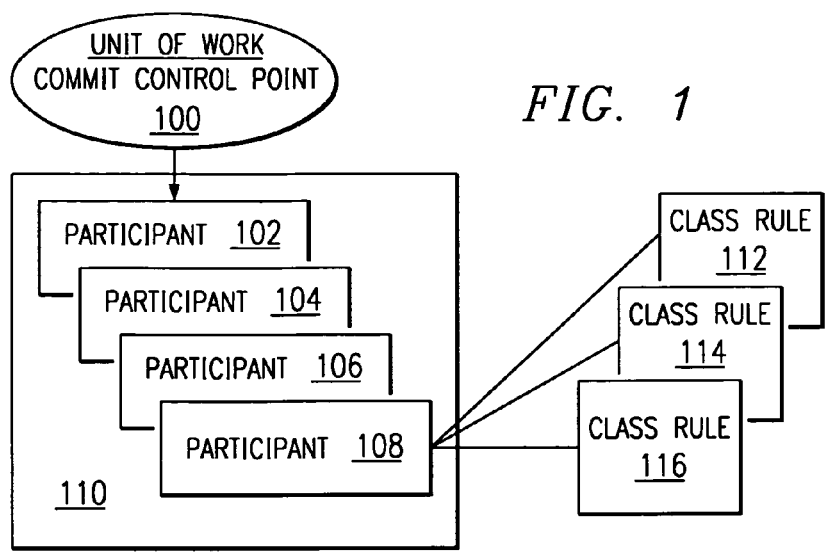
FIG. 1 is an illustration of a general integrity rule checking system in accordance with a preferred embodiment of the present invention.

The present invention provides a method, apparatus, and instructions for general integrity checking with rules in business and enterprise applications. The present invention provides the use of control points and units of work as a mechanism for identifying relevant integrity check times. A control point in the depicted examples is a decision point or a point of variability to which rules can be associated to implement variable behavior. The variable behavior can be changed by associating different rules with the decision point or by changing the process for rules already associated with the decision point. A number of different types of decision points are available. Some decision points imply a particular function while others do not imply one. This makes the capabilities of decision points very dynamic and places control in the hands of an individual who establishes the associations between the rules and the identified decision points.

The present invention applies the use of a control point, also referred to as a trigger point, at a point in the logic of an application, that occurs just as a unit of work completes. When this Unit of Work Control Point is encountered during the normal execution of the application, the participants in the unit of work are identified. Rules associated with the unit of work for each participant are obtained and run. The Unit of Work Control Point determines whether an integrity failure has occurred. In the examples that follow, a logical AND type of combining is used to combine the results from running the rules.

Control points are described in more detail in the Method and Apparatus for Identifying Applicable Business Rules, Filed Dec. 18, 1997, application Ser. No. 09/993,718, signed to the same Assignee, and incorporated herein by reference. Units of work in the present invention provides structural support for "work", which may be, for example, business tasks and processes. A unit of work may represent an application level structure. Units of work may follow the structures of the work done by employees and associates of a business. Natural structuring is provided whether or not each unit of work is totally or even partially automated. A unit of work may be started and once started, it may be suspended and subsequently resumed. In the depicted examples, a unit of work continues to exist until it completes and may do so by committing or aborting.

The present invention employs unit of work that represent pieces of business work and define each business context in which they are carried out. Such units of work are well known to those skilled in the art. The unit of work maintains a list of participants modified by processing carried out in association with the unit of work. Until and unless the unit of work commits, state changes made to those participants are not visible to processing associated with other units of work. From a business perspective, such a unit of work is a work in progress. If a unit of work completes by aborting, state changes to participants made as a part of its processing disappear. If the unit of work completes by committing, the state of the system is changed such that all of the changes to participants made during the unit of work become persistent and visible to all subsequently started units of work.

As shown in FIG. 1, the preferred mode of use of the present invention employs a unit of work which contains a trigger point 100 in addition to the usual list of participants 102–108. The trigger point serves as a mechanism for identifying the point in transaction commit processing just after the application has decided to commit a transaction. Just before commit processing begins, processing encounters the trigger point. Logic in the trigger point selects rules for the participants and runs them. Each rule checks the state of one or more participants and returns to the trigger point its judgment on whether the unit of work has maintained some feature that is important to the integrity of the application state. Based on the collective judgment of the rules, the control point determines whether the unit of work as a whole passes the integrity check. In the depicted example, a logical AND type of combining is used to combine the results of running the rules. If the collective judgment of the rules is that application state integrity has been maintained, the transaction is allowed to commit its changes to persistent storage. If the rules detect an integrity violation, the transaction is rolled back.

Figure 2:
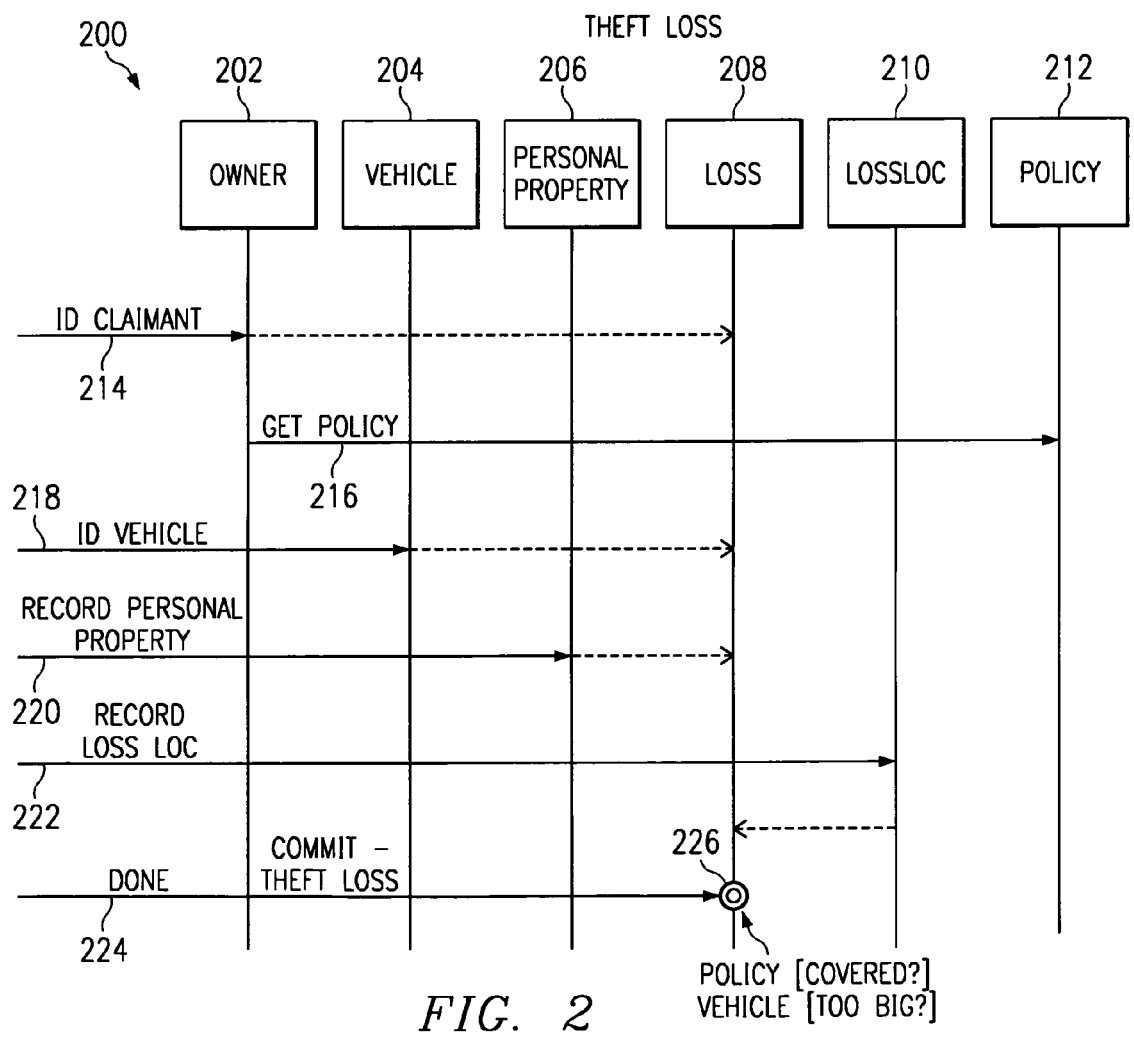
FIG. 2 is an object interaction diagram for a unit of work control point in accordance with a preferred embodiment of the present invention.

With reference now to FIG. 2, an object interaction diagram for a theft loss function is depicted in accordance with a preferred embodiment of the present invention. Diagram 200 illustrates an exemplary scenario in an insurance claim program involving the recording of a theft of golf clubs from an automobile while the owner was on vacation in Mexico. In this example, the policy does not cover theft of personal property when the theft occurs in Mexico.

The participant business objects in capturing the loss/ recording of the claim include owner 202, vehicle 204, personal property (golf clubs) 206, loss 208, loss location 210, and policy 212.

In recording this loss, the claimant owner is identified (step 214). After identifying the owner, the policy is obtained (step 216). The next step occurs in step 218 in which the vehicle is identified. Thereafter, the personal property is recorded in step 220 and the loss location is recorded in step 222. After these steps, a commit is performed for the theft loss in step 224, which will result in the control point 226, represented as a target in diagram 200, being encountered when Loss 208 tells the unit of work to commit. The control point finds rules for two of the participants in the unit of work (policy 212 and vehicle 204), which determine whether the loss of the property was covered and whether the lost property was too big to fit within the vehicle. If the loss property was too big to fit into the vehicle, the claim will be denied for possible fraud or mistake in entry of personal property. For example, if the personal property was identified as a refrigerator, it is likely that the refrigerator is too large to fit within a vehicle depending on the vehicle type identified in step 218.

Figure 3:
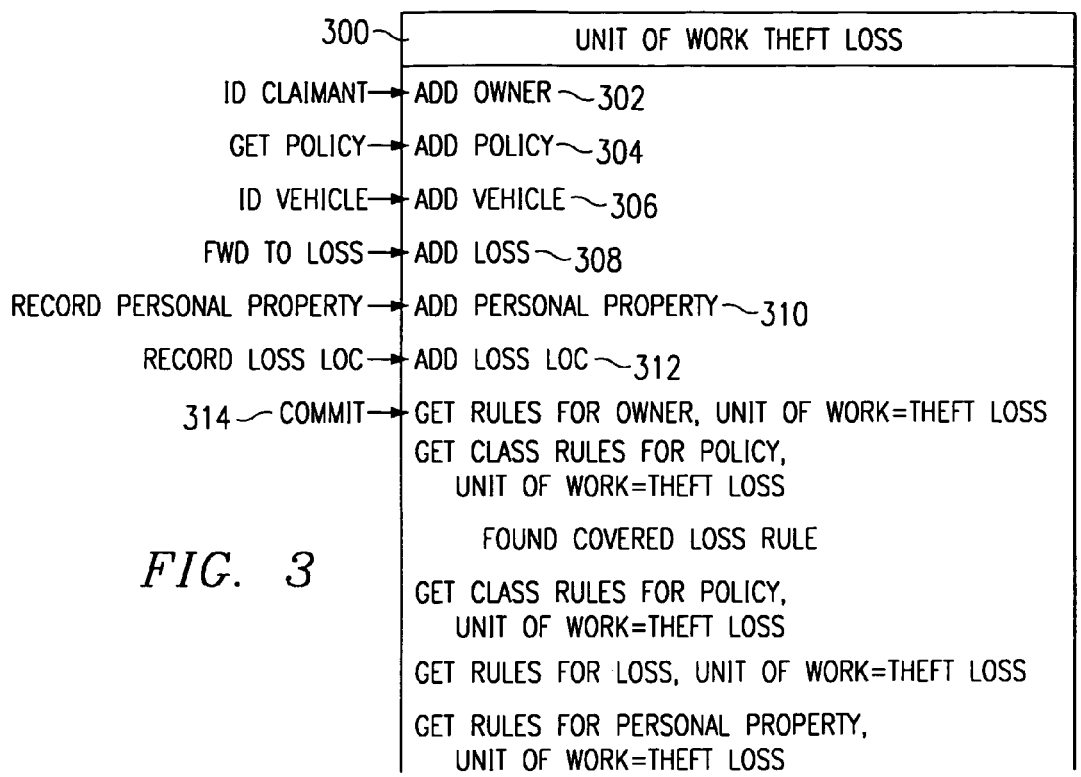
FIG. 3 is an illustration of a unit of work in accordance with a preferred embodiment of the present invention.

Turning now to FIG. 3, an illustration of a unit of work is depicted in accordance with a preferred embodiment of the present invention. Unit of work 300 is a theft loss unit of work in this example. Unit of work 300 accumulates participants in a business transaction. The participants in this example include an owner 302, a policy 304, a vehicle 306, a loss 308, a personal property 310, and a loss location 312. Owner 302 is added when the claimant is identified in step 214 in FIG. 2. Policy 304 is added to unit of work 300 when the policy is obtained. Identification of the vehicle in step 218 of FIG. 2 results in the adding of vehicle 306 to unit of work 300. Loss 308 is added to unit of work 300 when the personal property is forwarded to loss 208 in FIG. 2. Personal property 310 is added when the personal property is recorded in step 220 in FIG. 2.

A commit of the unit of work 314 will result in the unit of work commit control point cycling through the participants looking for integrity rules for each, associated with the type of unit of work; theft loss in this case. In this example, owner 302 has no rules for theft loss type of unit of work. Policy 304 does have a rule for unit of work 300, which is a covered loss rule. The covered loss rule is fired. In this example, the Covered Loss rule examines the loss location and determines that personal property was stolen from a vehicle when the vehicle was located in Mexico. Such a loss is not covered according to the rule for policy 304. As a result, the rule returns a false, indicating failure. Thereafter, the unit of work 300 aborts the commit because the cumulative set of objects is not consistent.

Had the covered loss rule not failed, the class rule for vehicle 306 for this theft loss unit of work would be obtained and applied. In this example, this rule, the vehicle's "I'm not big enough" rule, for the theft loss unit of work would have been applied, which for this example, prohibits refrigerators from being claimed as personal property loss from a small vehicle. The unit of work would look for integrity rules related to theft loss for the other participants. In this example, the other participants within the theft loss unit of work have no associated integrity rules, so the commit would complete.

Figure 4:
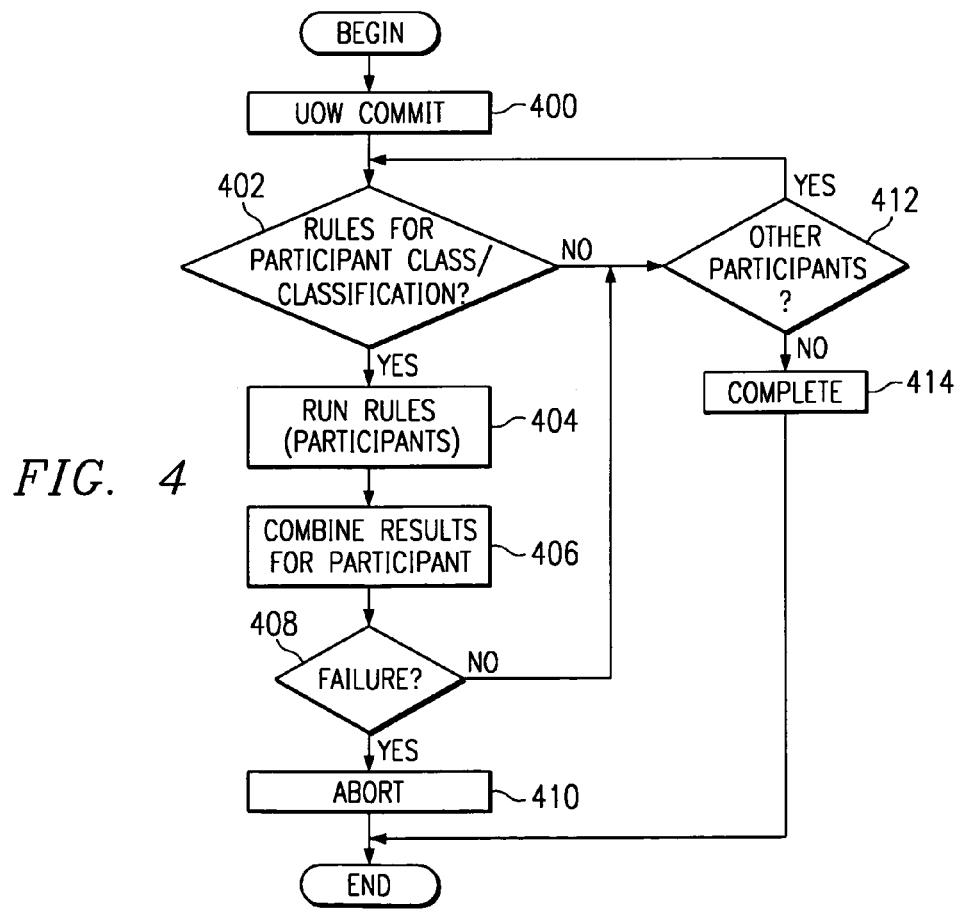
FIG. 4 is a flowchart of a process in a control point for searching for and applying rules to a unit of work in accordance with a preferred embodiment of the present invention.

With reference now to FIG. 4, a flowchart of a process in a unit of work in which an integrity control point is encountered during commit processing and which searches for and applies general integrity rules, is depicted in accordance with a preferred embodiment of the present invention. The process begins with a unit of work commit (step 400). In step 400, a unit of work control point is encountered in the commit processing in an application system. The unit of work control point attempts to locate integrity rules associated with a participant and the particular function the unit of work represents (step 402). In step 402, rules are identified and managed based on the names of participants and optionally on the type of function the unit of work represents. There may be no rules, one rule or multiple rules associated with verifying the integrity of the participant in the context of the unit of work.

If rules are present for a participant, these rules are run (step 404). Applicable rules are provided with the entire list of participants so that the integrity of the participant with respect to the entire system can be verified. The results of running the rules for the participant are combined (step 406). Next, a determination is made as to whether a rule failure has occurred (step 408). A failure occurs in the depicted example if the combined results of running the rules for a participant is negative. In the depicted example, the unit of work control point aborts the commit processing when this happens (step 410). In addition, when the unit of work control point aborts in step 410, the rule failure may be reported.

On the other hand, if a rule failure does not occur, a determination is made as to whether other participants are present (step 412). If other participants are present, a search for and firing of rules is repeated for this and other participants using steps 402–412. The unit of work control point does this for every participant even though there may be no rules for the participant to verify in the context of the unit of work.

With reference again to step 412, when there are no other participants to be given the opportunity the integrity of the application, then the unit of work is completed, committing changes introduced by this unit of work in the usual way (step 414).

Thus, the present invention allows for every rule for a unit of work to be provided with the entire set of participants in the unit of work to ensure system integrity from the perspective of each participant. The control point for a unit of work according to the present invention allows rules associated with participants in the unit of work to examine relationships participants for completeness, accuracy, and overall integrity.

Figure 5:
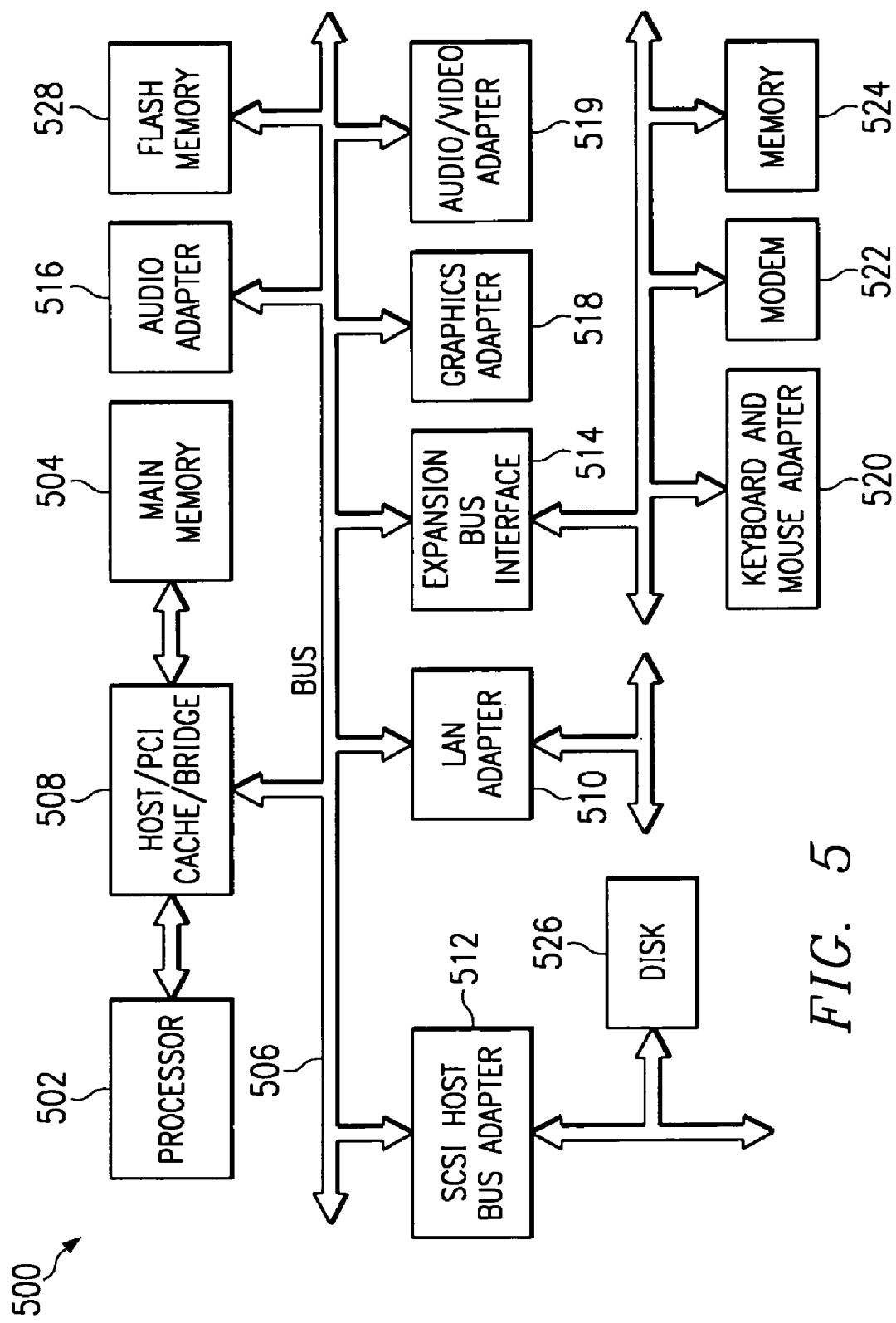
FIG. 5 is a block diagram of a data processing system in which the present invention may be implemented.

With reference now to FIG. 5, a block diagram of a data processing system in which the present invention may be implemented is illustrated. Data processing system 500 is an example of a client computer. Data processing system 500 employs a peripheral component interconnect (PCI) local bus architecture. Although the depicted example employs a PCI bus, other bus architectures such as Micro Channel and ISA may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, CD-ROM drive 530, and digital video disc read only memory drive (DVD-ROM) 532 in the depicted example. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 500. Instructions for the operating system, the object-oriented operating system, and applications or programs are located on storage devices, such as hard disk drive 526 and may be loaded into main memory 504 for execution by processor 502.

Those of ordinary skill in the art will appreciate that the hardware in FIG. 5 may vary depending on the implementation. For example, other peripheral devices, such as optical disk drives and the like may be used in addition to or in place of the hardware depicted in FIG. 5. The depicted example is not meant to imply architectural limitations with respect to the present invention. For example, the processes of the present invention may be applied to multiprocessor data processing system and may be implemented for use in a network in a distributed manner.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing general integrity checks using rules in an application running on a data processing system comprising:

identifying a point in a unit of work where application state integrity is to be verified, wherein the unit of work includes a plurality of participants;

responsive to determining that the unit of work is to be completed, obtaining rules associated with each participant in the unit of work; and responsive to obtaining the rules, running the rules obtained for each of the participants to verify the integrity of an application state, according to the plurality of participants.

2. The method of claim 1, further comprising:

responsive to a negative result obtained by running the rules, aborting the unit of work.

3. The method of claim 1, further comprising:

responsive to a positive result obtained by running the rules, committing the unit of work.

4. The method of claim 1, wherein each participant is associated with a name and wherein the step of obtaining rules associated with each participant in the unit of work comprises obtaining rules based on the name associated with the participant.

5. The method of claim 4, wherein the plurality of participants are a plurality of objects and wherein the name associated with an object within the plurality of objects is the class name of a participating object.

6. The method of claim 1, wherein each participant is associated with a name, wherein the unit of work is associated with a type, and wherein the step of obtaining rules associated with each participant in the unit of work comprises obtaining rules based on the name associated with the participant and the type associated with the with of work.

7. The method of claim 1, wherein at least zero integrity checking rules are associated with each participant within the plurality of participants.

8. A method in a data processing system for performing general integrity checks using rules, the method comprising:
  detecting a commit for a unit of work;
  identifying participants in the unit of work in response to detecting the commit for the unit of work;
  determining whether rules are present for the participants in the unit of work;
  running the rules for participants identified as having at least one rule;
  determining whether a violation of an integrity rule within the rules identified for any participant has occurred; and
  committing the unit of work depending on the results of running the rules.

9. The method of claim 8 further comprising:
  aborting completion of processing by the unit of work in response to a determination that a violation of a rule has occurred; and
  committing completion of processing by the unit of work in response to a determination that no violation of a rule has occurred.

10. The method of claim 8, wherein each participant has zero or more rules associated therewith.

11. The method of claim 8, wherein each rule associated with a unit of work has available for use each participant within the unit of work.

12. An enterprise application on a computer readable medium executing on a computer, the enterprise application comprising:
  a unit of work, wherein the unit of work accumulates participants that affect a state of the enterprise application;
  a plurality of business rules, wherein the plurality of rules are used to verify the integrity of the application state; and
  a unit of work control point, wherein the unit of work control point locates applicable rules for participants in response to an activation of the unit of work to complete processing of the unit of work.

13. The enterprise application of claim 12, wherein the activation of the unit of work control point for the unit of work is initiated by a commit instruction to the unit of work.

14. The enterprise application of claim 12, wherein the control point identifies applicable rules for all of the participants in the unit of work.

15. The enterprise application of claim 12, wherein the control point applies applicable rules to a portion of the participants in the unit of work.

16. The enterprise application of claim 12, wherein the applicable rules are identified based on a name associated with the participant.

17. The enterprise application of claim 12, the participant is an object and wherein the name is the class name of the participating object.

18. The enterprise application of claim 17, wherein the unit of work is associated with a type and wherein the applicable rules also are identified based on the type associated with the unit of work.

19. A data processing system for performing general integrity checks using rules in an application on a computer readable medium executing on a computer, the data processing system comprising:
  identifying means for identifying a point in a unit of work where application state integrity is to be verified, wherein the unit of work includes a plurality of participants;
  first obtaining means, responsive to determining that the unit of work is to be completed, for obtaining rules associated with each participant in the unit of work; and
  second obtaining means, responsive to obtaining the rules, for running the rules obtained for each of the participants to verify the integrity of the system, according to the plurality of participants.

20. The data processing system of claim 19, further comprising:
  aborting means, responsive to a negative result obtained by running the rules, for aborting the unit of work.

21. The data processing system of claim 19, further comprising:
  committing means, responsive to a positive result obtained by running the rules, for committing the unit of work.

22. A data process system for performing general integrity checks using rules, the data processing system comprising:
  a computer readable medium executing on a computer comprising:
    detecting means for detecting a commit for a unit of work;
    identifying means for identifying participant in the unit of work in response to detecting the commit for the unit of work;
    first determining means for determining whether riles are present for the participants in the unit of work;
    running means for running the rules for participants identified as having at least one rule;
    second determining means for determining whether a violation of an integrity rule within the rules identified for any participant has occurred; and
    committing means for committing the unit of work depending on the results of running the rules.

23. The data processing system of claim 22 further comprising:
  aborting means for aborting completion of processing by the unit of work in response to a determination that a violation of a rule has occurred; and
  committing means for committing completion of processing by the unit of work in response to a determination that no violation of a rule has occurred.

24. The data processing system of claim 22, wherein each participant has zero or more rules associated therewith.

25. A computer readable medium having computer readable instructions executing on a computer for performing general integrity checks using rules in an application comprising:
  first instructions for identifying a point in a unit of work where application state integrity is to be verified, wherein the unit of work includes a plurality of participants;
  second instructions for responsive to determining that the unit of work is to be completed, obtaining rules associated with each participant in the unit of work; and
  third instructions for responsive to obtaining the rules, running the rules obtained for each of the participants to verifying the integrity of the system, according to the plurality of participants.

26. The computer readable media of claim 25, further comprising:
  first instructions for responsive to a negative result obtained by running the rules, aborting the unit of work.

27. The computer readable media of claim 25, further comprising:
   first instructions for responsive to a positive result obtained by running the rules, committing the unit of work.

28. A computer readable medium having computer readable instructions executing on a computer for performing general integrity checks using rules, comprising:
   first instructions for detecting a commit for a unit of work;
   second instructions for identifying participants in the unit of work in response to detecting the commit for the unit of work;
   third instructions for deter whether rules are present for the participants in the unit of work;
   fourth instructions for running the rules for participants identified as having at least one rule;
   fifth instructions for determining whether a violation of an integrity rule within the rules identified for any participant has occurred; and
   sixth instructions for committing the unit of work depending on the results of running the rules.

29. The computer readable media of claim 28 further comprising:
   first instructions for aborting completion of processing by the unit of work in response to a determination that a violation of a rule has occurred; and
   second instructions for committing completion of processing by the unit of work in response to a determination that no violation of a rule has occurred.

* * * * *